US009061470B2

(12) United States Patent
Cole

(10) Patent No.: US 9,061,470 B2
(45) Date of Patent: Jun. 23, 2015

(54) DEVICE, KIT AND METHOD FOR TIRE REPAIR

(76) Inventor: Jeffrey H. Cole, Stafford, VA (US)

(*) Notice: Subject to any disclaimer, the term of this patent is extended or adjusted under 35 U.S.C. 154(b) by 84 days.

(21) Appl. No.: 13/197,354

(22) Filed: Aug. 3, 2011

(65) Prior Publication Data

US 2013/0031759 A1 Feb. 7, 2013

(51) Int. Cl.
*B29C 73/06* (2006.01)
*B29C 73/10* (2006.01)
*B29C 73/02* (2006.01)
*B29C 73/08* (2006.01)
*B29C 73/12* (2006.01)

(52) U.S. Cl.
CPC ............ *B29C 73/06* (2013.01); *Y10T 29/49718* (2015.01); *Y10T 152/10909* (2015.01); *B29C 73/02* (2013.01); *B29C 73/08* (2013.01); *B29C 73/10* (2013.01); *B29C 73/12* (2013.01)

(58) Field of Classification Search
CPC ....................................................... B29C 73/06
USPC .......... 29/272, 402.09; 254/21, 25, 19; 269/3, 269/6, 95; 206/582; 227/67, 68, 73; 81/15.7; 152/370; 156/97
See application file for complete search history.

(56) References Cited

U.S. PATENT DOCUMENTS

| | | | |
|---|---|---|---|
| 490,369 A * | 1/1893 | Sloper .............................. 81/15.5 |
| 2,727,554 A * | 12/1955 | Westfall ......................... 152/370 |
| 3,013,454 A | 12/1961 | Gruber |
| 4,802,388 A * | 2/1989 | Roberts ........................... 81/15.7 |
| 4,951,531 A | 8/1990 | Nishio |
| 5,609,715 A * | 3/1997 | Gallentine .................... 156/394.1 |
| 6,170,361 B1 * | 1/2001 | Yates ............................... 81/15.7 |
| 2008/0127472 A1 * | 6/2008 | Whitehead et al. ........... 29/221.5 |

OTHER PUBLICATIONS

International Search Report/Written Opinion, PCT/US2012/049440, Oct. 23, 2012.

* cited by examiner

*Primary Examiner* — David Bryant
*Assistant Examiner* — Steven A Maynard
(74) *Attorney, Agent, or Firm* — Fitch, Even, Tabin & Flannery LLP

(57) ABSTRACT

A tire repair device for repairing a puncture in a vehicle tire includes an applicator including a stem portion and a tip portion for insertion into a puncture and through a wall of the tire, at least a part of the stem portion and the tip portion having a passage therethough, and a plug having a plug shaft made of a resilient material, a stopper portion provided at a first end of the plug shaft and a patch portion provided at a second end of the plug shaft opposite the first end, the patch portion having a closed position in which the patch portion is folded around the plug shaft and an open position in which the patch portion is extends outwardly from the plug shaft in a direction substantially perpendicular to the plug shaft. The plug shaft and the patch portion are guidable through the passage in the applicator.

20 Claims, 8 Drawing Sheets

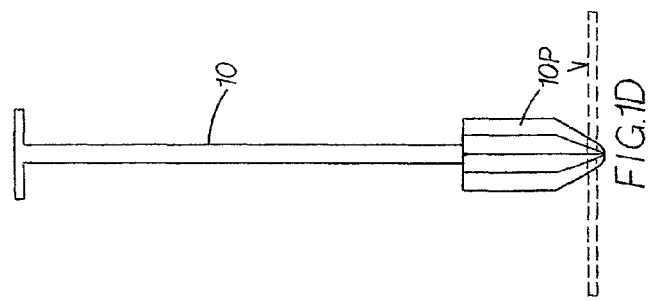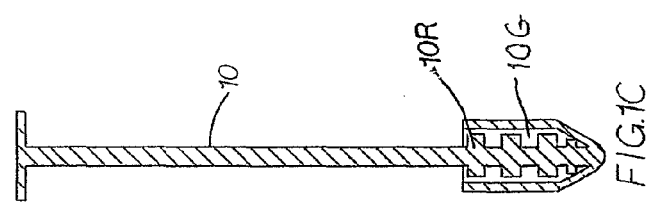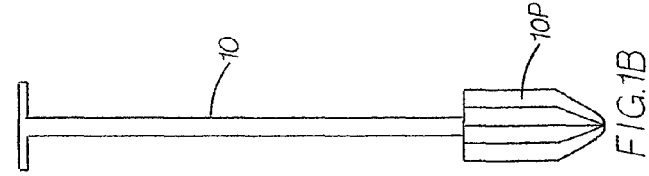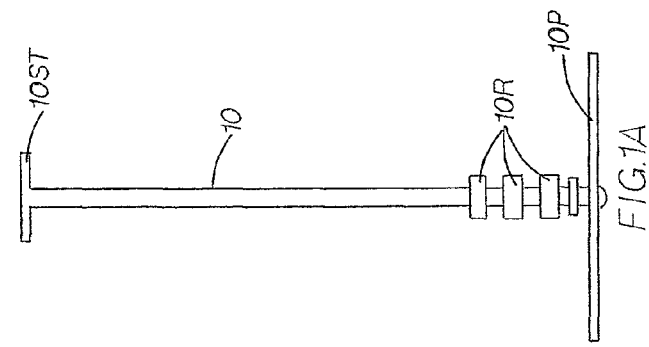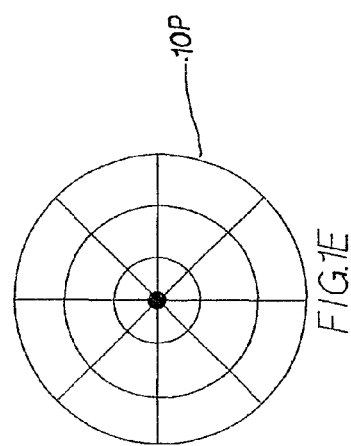

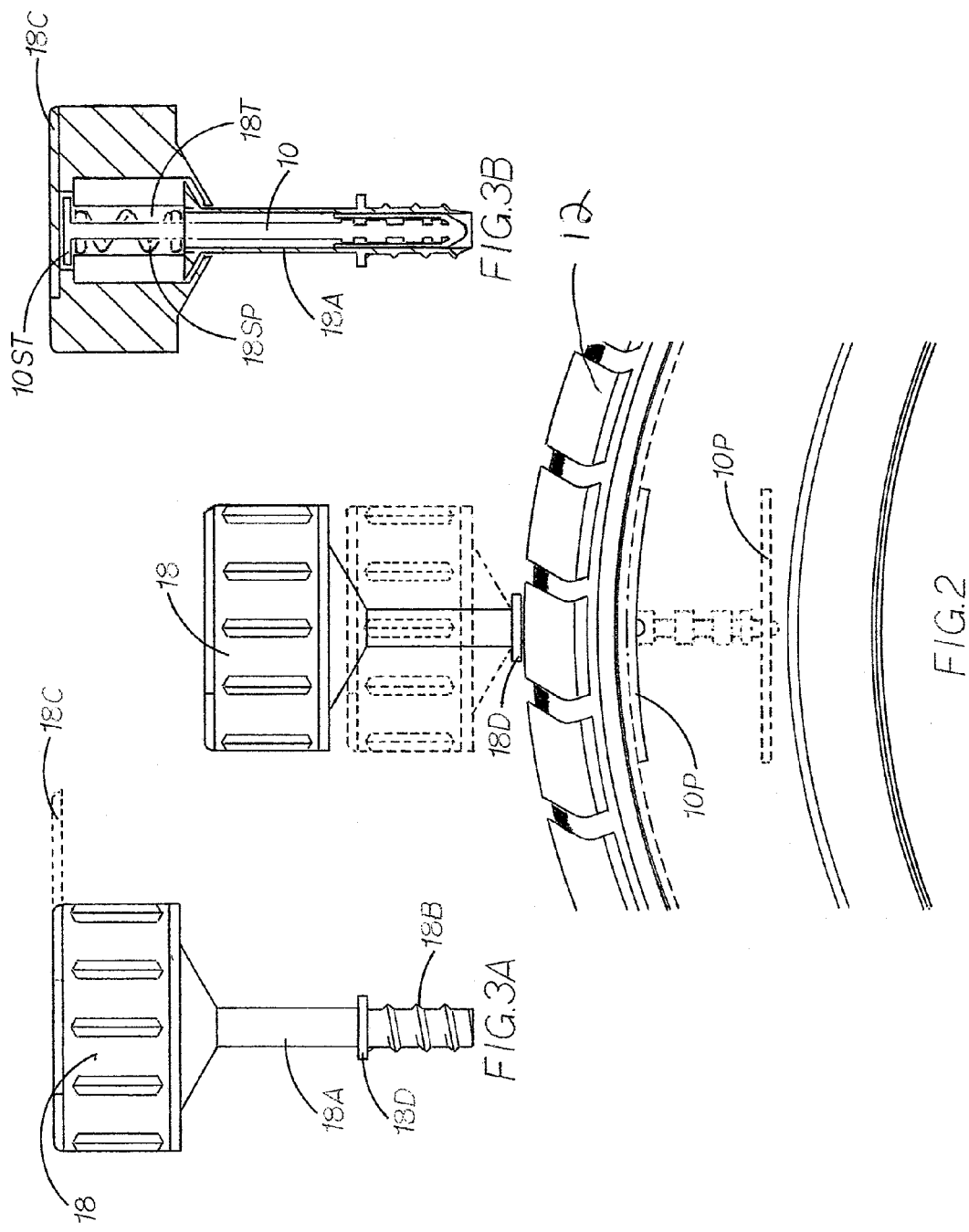

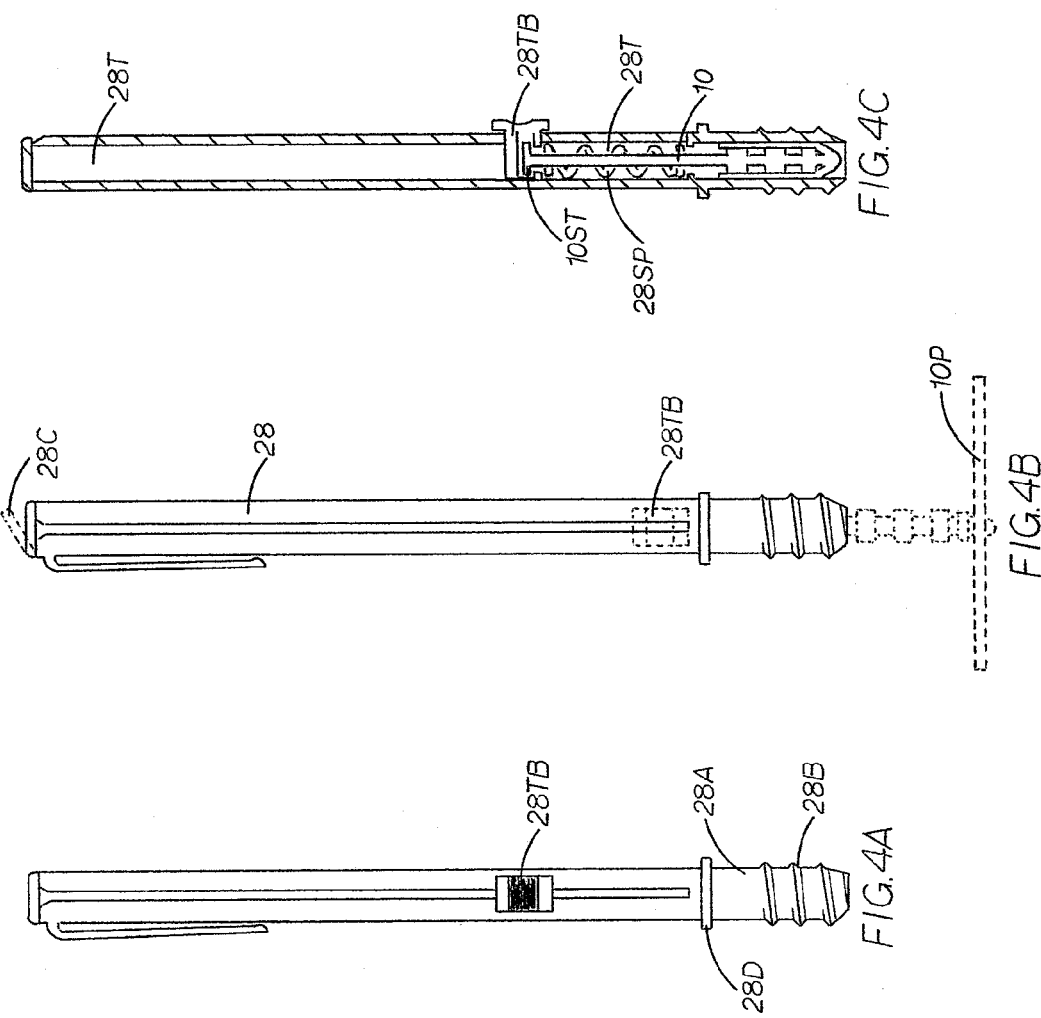

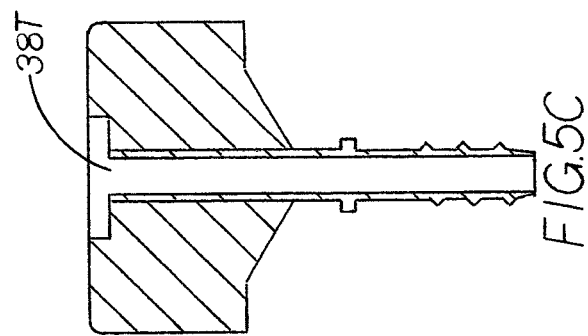
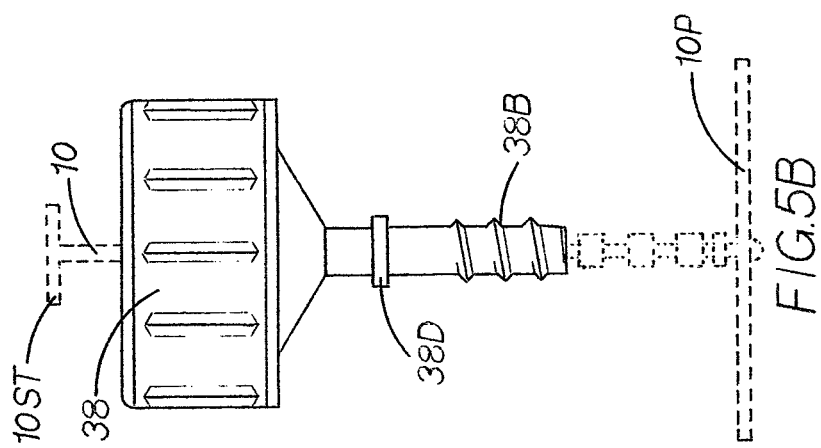
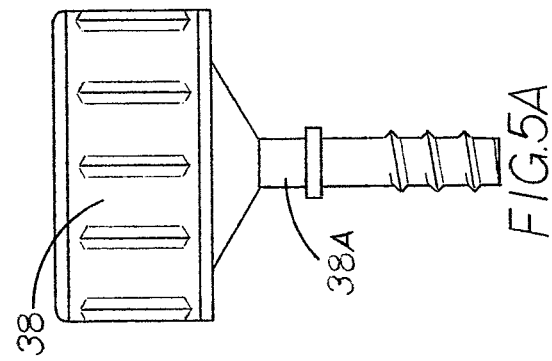

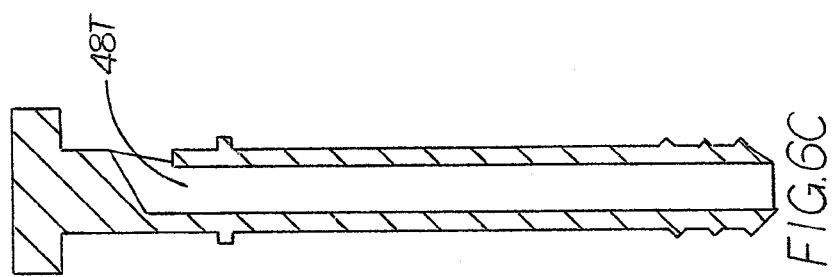
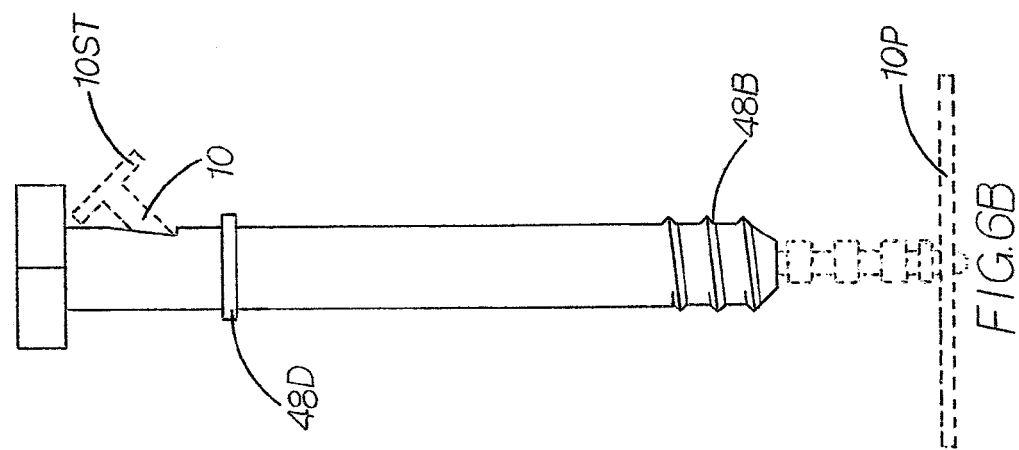
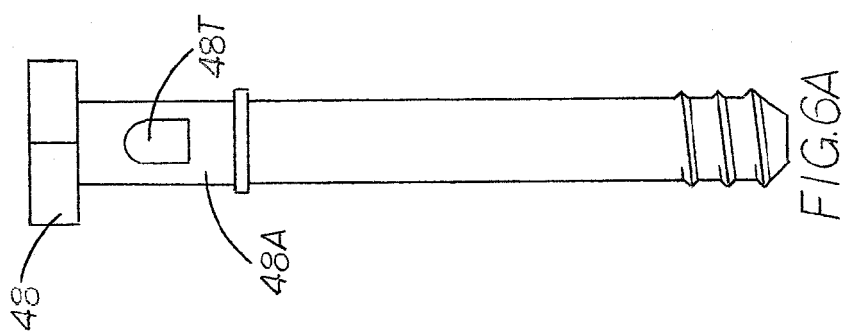

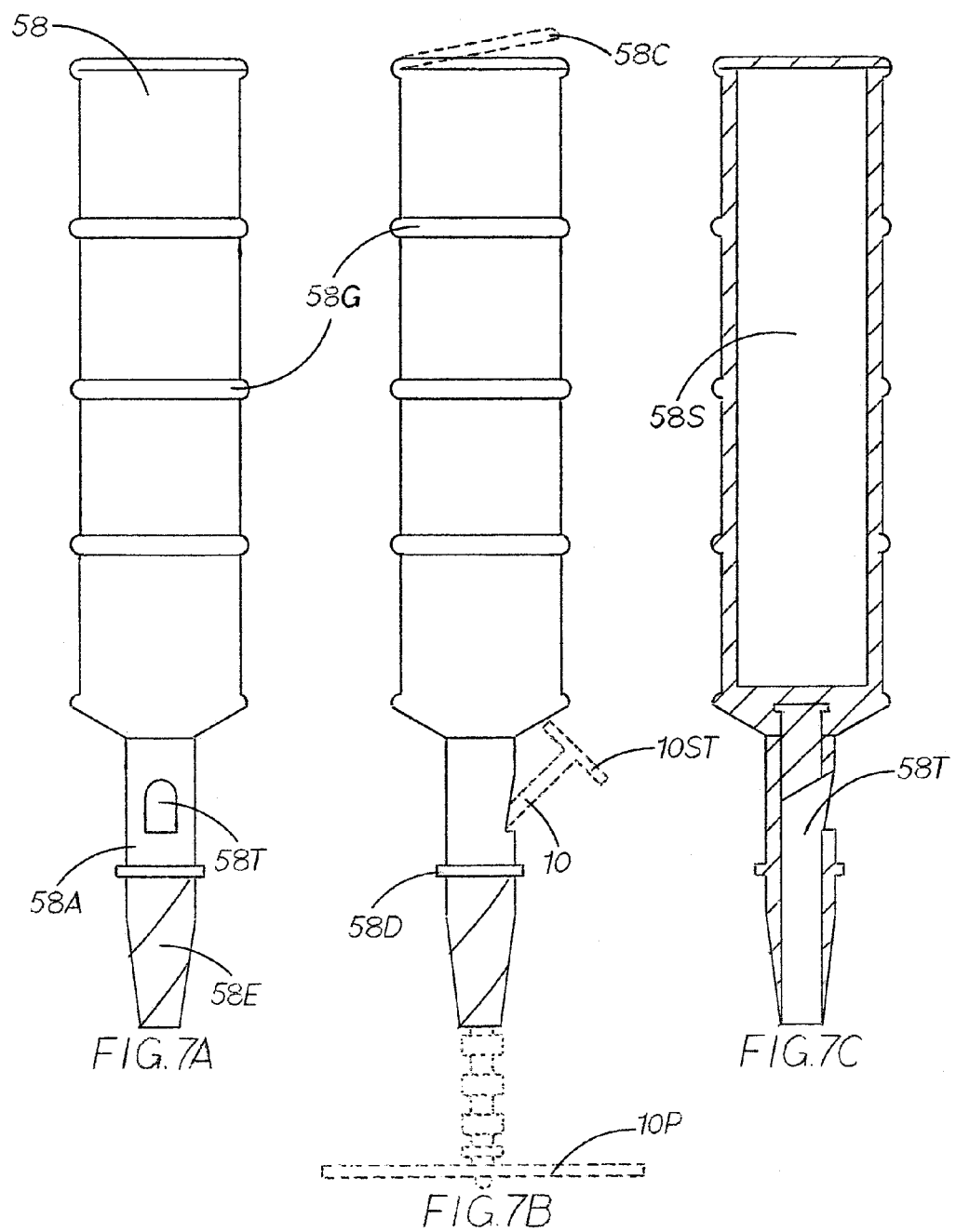

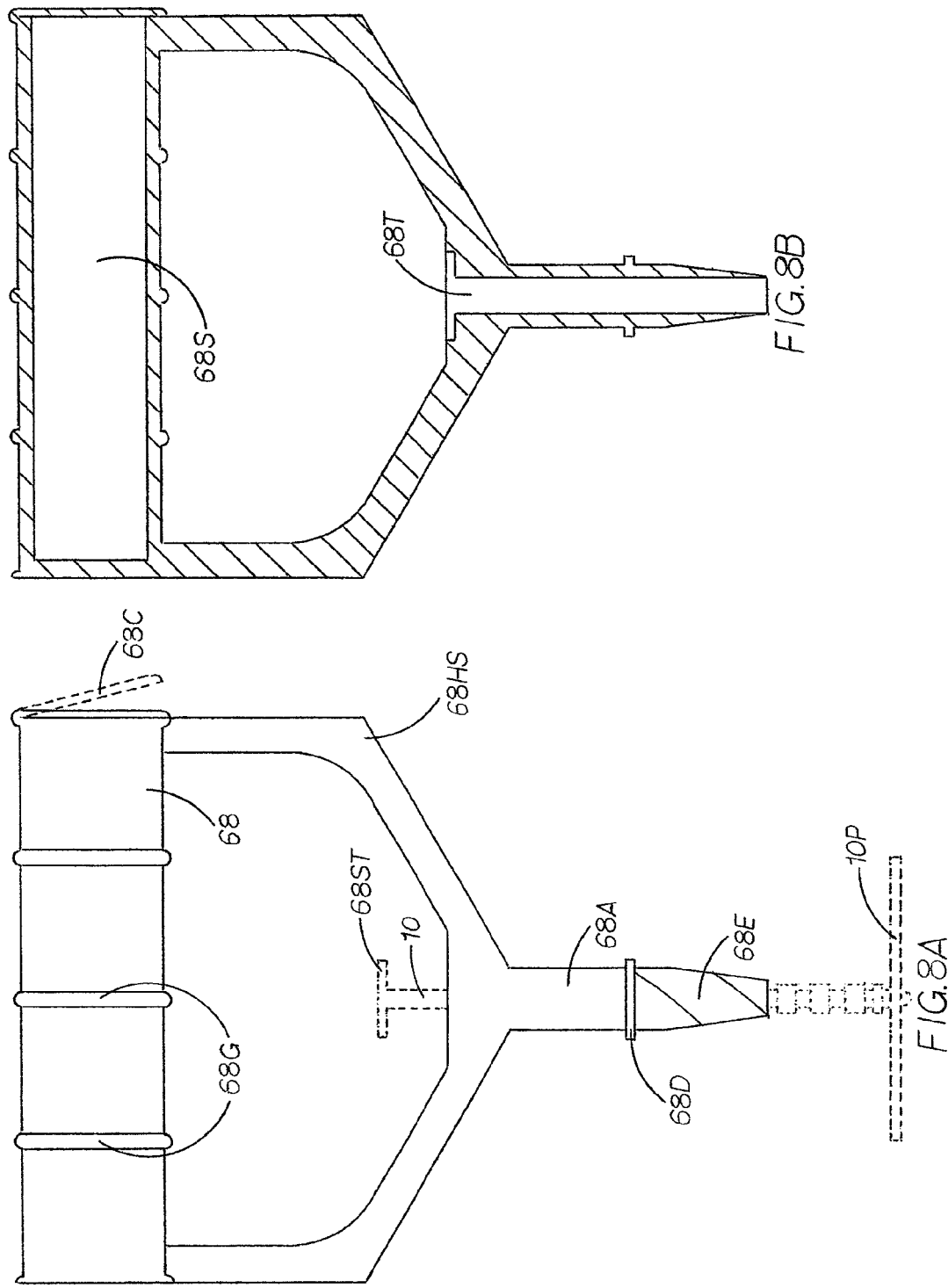

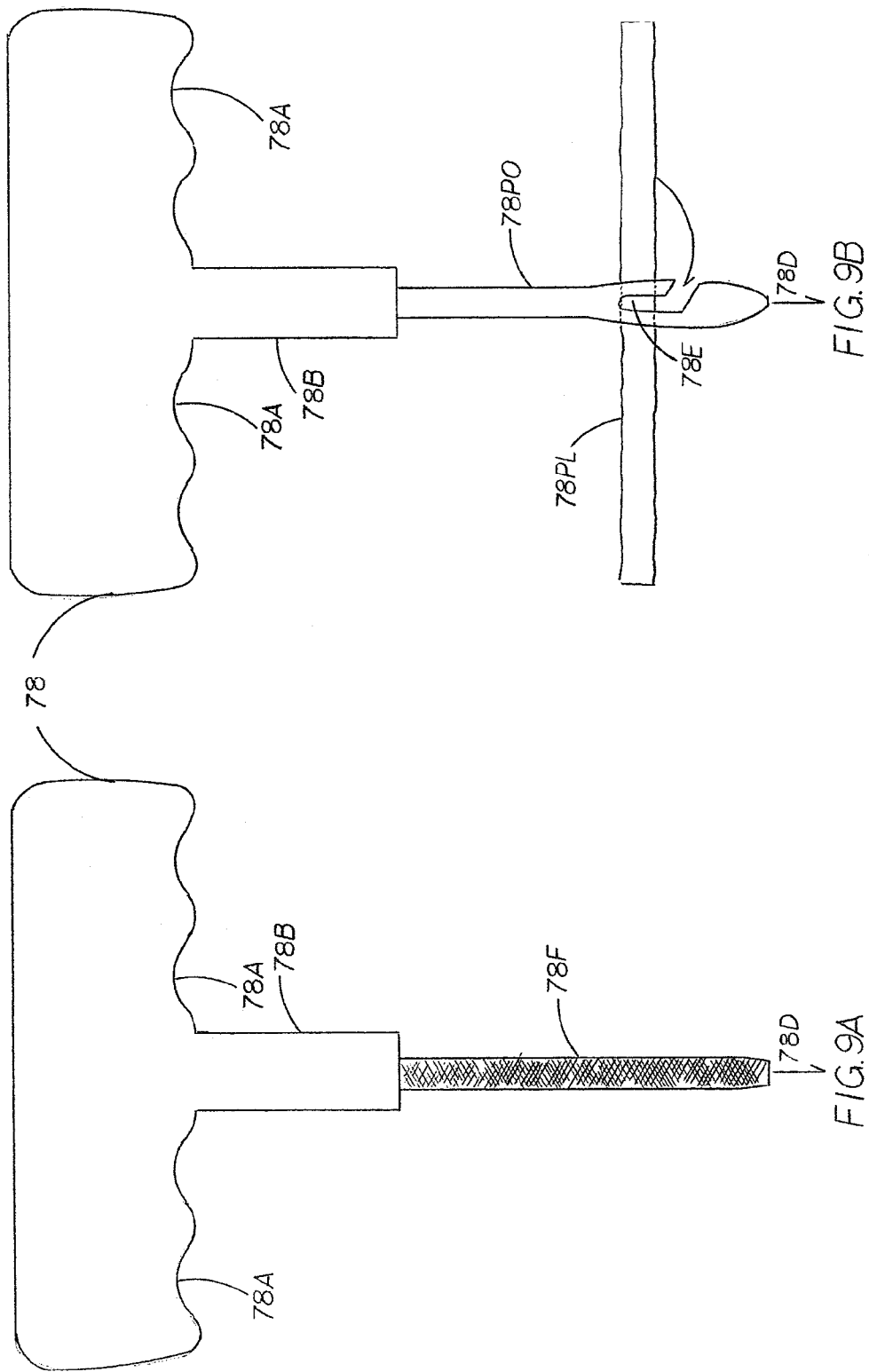

DEVICE, KIT AND METHOD FOR TIRE REPAIR

BACKGROUND OF THE INVENTION

An increasing number of automobile repair shops are declining the business of plugging/patching automobile tires, opting for the more profitable choice of total tire replacement, even when the tires are repairable. This trend is directly responsible for the creation of several dilemmas affecting our economy and environment today. Worth noting is the forcing of the public to unnecessarily spend millions and millions of their dollars that could go towards other much needed purchases for the household rather than to the very expensive cost (by comparison) of premature replacement of their tires. It is further noted that a large portion of those discarded tires end up in landfills, resulting in a serious health threat to the environment due to the exposure of the tires to the elements. These tires hold water, the main breeding grounds for mosquitoes that carry potentially deadly diseases. Tire piles can be set on fire through arson or accident; these fires are hard to extinguish, and produce dark heavy thick smoke and toxic run-off into the waterways. Tire piles also harbor other vermin such as deadly disease carrying rats and snakes. These are all valid health concerns that are associated with the current and increasing number of landfills being built today.

Another dilemma is the use of punctured tire repair sealants which come with a host of explosive, life threatening, cancer causing, ozone depleting effects that the public is being forced to purchase and use as an easy alternative to the total tire replacement that would otherwise be necessary because of the refusal of repair shops to repair the tires, as well as the extreme difficulty involved with the attempted usage of the do-it-yourself puncture tire repair kits currently on the market.

Because the patching of a tire historically has only taken place in some form of an automobile repair shop utilizing large machinery, the only other current option available to the vehicle owner/driver is to purchase an inexpensive puncture tire repair kit similar to the one shown in FIGS. 9A and 9B, then singularly plug the punctured tire; however, the currently sold tire repair kits are physically challenging to the user since the user must have strong hand and upper body strength in order to use the current tire repair kits like the one displayed in FIGS. 9A and 9B. Each of the tools in the current tire repair kits like the one displayed in FIGS. 9A and 9B include a handle 78 that has predetermined finger positions 78A for four fingers, therefore placing the pole support 78B (usually of a ½" diameter or more) directly in between the middle and ring fingers of the user, causing great discomfort to the hand when in use, a painful sensation best described as having your hand squeezed while you're wearing a ½" thick ring on your middle or ring finger, as the device is clenched tightly by the user in order to make the device usable.

Great physical strength is further needed in order to jack/lift the car and tire/wheel off the ground surface, in addition to undoing and remove the lug nuts, to lift and remove the tire(s) off of the vehicle especially if the hole is in a rear tire (an area typically tight and very difficult to maneuver in). Then, the user will have to fit the eye 78E of the devices pole 78PO with the equipped plug 78PL; note that when the plug 78PL is combined with the pole 78PO, it increases the outside diameter of the repair portion of the device when inserting the device FIG. 9B in the direction of 78D in upwards of 500% and more from the actual size of the punctured hole in the tire itself. Inserting the devices pole 78PO with the equipped plug 78PL tends to be a very difficult task to accomplish, because attempting to force a much larger diameter consisting of a very sticky tire plug into a very small diametric punctured hole in a tire will require an enormous amount of hand and upper-body strength to perform this task. It is at this juncture that the chances increase that the user will over-force the pole portion 78PO along with the plug 78PL deeply into the inner tire area to the point that the plug is totally inside of the tire, so that when the user then pulls outward as to remove the tool FIG. 9B from the tire, the plug will detach from the said tool and free-fall into the tire, possibly causing a problem to those wheels equipped with a tire pressure monitoring system (TPMS). This task of self plugging punctured tires is so difficult that users tend to either unsafely delay the self repair by just adding air to the tire for months at a time until the tire is worn beyond any type of repair, unfortunately putting themselves and the public at risk of injury or even death due to driving on either under/over inflated tires; or until they can afford total replacement of the damaged tire. In a desperate attempt the owner/driver has even been known to "file-out" the hole by using the current kit-equipped file 78F shown in FIG. 9A as the only way to alleviate some of the physical stresses the user is sure to endure by making the hole larger for the insertion of the plug; only to find that they erroneously made the hole larger. This error causes more failures of the seal to re-leak due to the "file-out" hole being made too large, a total contradiction to the task since the logical idea would be to keep the hole original as possible whenever a patching or plugging of a tire was to take place. Then after all of that, the user must safely re-outfit the vehicle with the just plugged tire.

With the tire repair kit shown in FIGS. 9A and 9B, it is generally recommended by the manufacturer to leave a small portion of the end of the plug outside the tire exposed. Another negative aspect of the current tire repair kit is the "snagging" of the plug that takes place when the recommended exterior exposed end of the plug that is in the tire comes in contact with the road during the slightest event of tire spin-out, prone to happen on wet slippery surfaces or when quick accelerations are taking place. The chances of snagging are even more likely to take place if the exposed end of the plug is located at the outer-most largest diameter of the tires tread versus the smallest diameter which is located down in the valley of the treaded area of the tire where the exposed end could still be snagged if the tire should run over debris covered road surfaces, especially on/off ramps or highway shoulders.

SUMMARY OF THE INVENTION

The present invention relates to a tire repair device for repairing a puncture in a vehicle tire. The device includes an applicator including a stem portion and a tip portion for insertion into a puncture and through a wall of the tire, at least a part of the stem portion and the tip portion having a passage therethough, and a plug comprising a plug shaft made of a resilient material, a stopper portion provided at a first end of the plug shaft and a patch portion provided at a second end of the plug shaft opposite the first end, the patch portion having a closed position in which the patch portion is folded around the plug shaft and an open position in which the patch portion is extends outwardly from the plug shaft in a direction substantially perpendicular to the plug shaft, the plug shaft and the patch portion of the plug being guidable through the passage in the applicator.

The present invention also relates to a method of using such a tire repair device including inserting the tip portion of the applicator into a puncture and through a wall of the tire, pushing the plug, with the patch portion in the closed position through the passage through at least a part of the stem portion and the tip portion so that the patch portion is completely inside the tire, expanding the patch portion into the open position in which the patch portion is extends outwardly from the plug shaft in a direction substantially perpendicular to the plug shaft, pulling the stopper portion of the plug away from the tire, and cutting portions of the stem portion and stopper portion of the plug that extend outside the tire.

The present invention also relates to a kit, including an applicator including a stem portion and a tip portion for insertion into a puncture and through a wall of the tire, at least a part of the stem portion and the tip portion having a passage therethough, and a plurality of plugs, each plug comprising a plug shaft made of a resilient material, a stopper portion provided at a first end of the plug shaft and a patch portion provided at a second end of the plug shaft opposite the first end, the patch portion having a closed position in which the patch portion is folded around the plug shaft and an open position in which the patch portion is extends outwardly from the plug shaft in a direction substantially perpendicular to the plug shaft, the plug shaft and the patch portion of the plug being guidable through the passage in the applicator.

BRIEF DESCRIPTION OF THE DRAWINGS

FIG. 1A is a front elevational view of an embodiment of the present invention showing the portion identified as the plug in the expanded-open position.

FIG. 1B is another front elevational view of the embodiment of FIG. 1A; in the closed-ready position.

FIG. 1C is a cross-sectional view of the embodiment of FIG. 1A as displayed in the folded-closed position.

FIG. 1D is another front elevational view of the embodiment of FIG. 1A, further illustrating the expanding direction of the embodiment.

FIG. 1E is a bottom plan view of the receiving end of the plug as a prelude to being affixed for its intended purpose.

FIG. 2 is a schematic view of an embodiment of the present invention showing the portion identified as the applicator attached to the tire by the user.

FIG. 3A is a front elevational view of an embodiment of the present invention showing the portion identified as the applicator.

FIG. 3B is a cross-sectional view of the embodiment of FIG. 3A.

FIG. 4A is a front elevational view of an embodiment of the present invention showing the portion identified as the applicator.

FIG. 4B is another front elevational view of the embodiment of FIG. 4A.

FIG. 4C is a cross-sectional view of the embodiment of FIG. 4A.

FIG. 5A is a front elevational view of an embodiment of the present invention showing the portion identified as the applicator.

FIG. 5B is another front elevational view of the embodiment of FIG. 5A.

FIG. 5C is a cross-sectional view of the embodiment of FIG. 5A.

FIG. 6A is a front elevational view of an embodiment of the present invention showing the portion identified as the applicator.

FIG. 6B is a side elevational view of the embodiment of FIG. 6A.

FIG. 6C is a cross-sectional view of the embodiment of FIG. 6A.

FIG. 7A is a front elevational view of an embodiment of the present invention showing the portion identified as the applicator.

FIG. 7B is a side elevational view of the embodiment of FIG. 7A.

FIG. 7C is a cross-sectional view of the embodiment of FIG. 7A.

FIG. 8A is a front elevational view of an embodiment of the present invention showing the portion identified as the applicator.

FIG. 8B is a cross-sectional view of the embodiment of FIG. 8A.

FIG. 9A and FIG. 9B are illustrations of a conventional tire repair kit.

DETAILED DESCRIPTION OF A PREFERRED EMBODIMENT

The present invention provides a smarter punctured tire repair kit that would be exciting to use, and one that a much larger number of the vehicle operators could and would want to use. This is accomplished by a product that is excellent for the environment, one that will reduce health risk, is inexpensive to purchase by comparison, extremely easy to use, incredibly compact, portable, stylish, and money saving to the user.

In one embodiment, the present invention is directed to a hand operated, do-it-yourself punctured tire repair kit that has been ingeniously designed not only for simplicity of use, but also to be effortless in use, eliminating the need for physical strength (a known common denominator associated with conventional automobile tire repairs), pressure, or force when operational, and totally eliminates the need of "file-out" in addition to the tool FIG. 9A used to "file-out" the hole as used in association with the tire repair kits similar to the one depicted in the references FIG. 9A and FIG. 9B, therefore allowing the user to perform fast clean comfortable on the spot self repairs literally in minutes and while utilizing approximately 70-80% less materials by volume when compared to the current kit displayed in FIGS. 9A and 9B. This invention has further been designed not to damage the delicate radio frequencies of tire pressure monitoring systems (TPMS) as automobile manufactures continue to insist that tire sealants cause safety issues and will void the wheel warranties of vehicle and therefore should never be used; and further, to eliminate the damaging effects of enlarging the hole of a punctured tire by "file-out" of the hole which breaks and shaves off by reducing portions of the steel belts of the tire therefore depleting its integrity while also removing the much needed rubber of the tire when doing so. The present invention's ingenious applicator with an attached hollow stem designed to be inserted into the pre-existing hole in the tire therefore causing the hole to gently and temporarily stretched open creating an unobstructed clear tunnel directly through the tire as a prelude for the unabated insertion/injection of the equally ingenious dual purpose plug which has been designed to patch the inner wall of the tire while simultaneously plugging the hole of the said punctured tire, and allowing the invention to be used even for steel belted tires compiled of layers of steel since the present invention will not shave or weaken the steel, but temporarily move it aside just enough for the placement of the dual purpose plug portion of the invention to be put in place. Once the applicator is removed; tires, being made of vulcanized rubber will then assume back to their near original position; therefore permitting the present invention to simultaneously seal and lock the patch portion of the plug to the punctured inner wall of the tire, and plug portion in and to the hole portion of the tire therefore providing the ultimate dual sealing to the hole of the tire.

This invention was designed to repair, inter alia, automobile, truck, RVs, semi-tractor trailers, motorcycles and more, tubeless steel-belted tires experiencing air leaks or flats resulting from tire punctures caused by foreign objects piercing the outer/inner area walls breaching its air tight integrity. The user can make repairs with this invention long as the tire is still intact according to safety standards, and even if the tire is completely flat.

Even though the exterior design of the applicator tool is displayed in various forms, the main spirit of the (applicator) tool will consist of a handle equipped with or without a (tunnel), an inner hollow stem portion (tunnel), and the exterior (stem) portion that could be (threaded) permitting a means of screwing the applicator tool into and out-from the tire; or a (straight stem) portion that could simply be pushed into and out-from its operational position attaching it to the tire; further, utilizing its tunneling capabilities to act as the recipient of the dual purpose (plug) portion of the invention to be effortlessly inserted/injected through the tunnel with zero resistance; capable of simultaneously patching and plugging the hole, sealing the air leak of the tire virtually without the need of dismounting the tire from the wheel, and/or the wheel from the vehicle; further designed to be fully operational even in tight difficult to maneuver in spaces when using the current puncture tire repair kit shown in FIGS. 9A and 9B. Though the illustrations are near scale in some portions as to reveal the true compact size of the applicators, this approach can be manufactured on any scale to fit, secure, and repair tires of any size; also, in further utilizing this inventions core, concept and spirit, any applicator can be fitted with or without a spring activated compression chamber, and can be fitted with a stem consisting of or without a threaded tip.

FIG. 1A shows a front elevational view of the plug 10 portion of the present invention, in the expanded-open position further revealing the receiving end of the patch portion 10P of the plug, shown in bottom plan view in FIG. 1E, and the ribs 10R both of which are designed for the trapping of glue, therefore doubling the sealing effectiveness once the patch and plug bonds with the tire; further, the end portion 10ST identified as a (plug stopper) is consistent throughout all diagrams of the plug that keeps the plug attached to the applicator until the user intentionally detaches it, therefore preventing the accidental dropping of the plug through the applicator and into the tire by the user. The material of the plug can be rubber, vulcanized rubber, or any other suitable temperature resistant materials, as would be known in the art.

FIG. 1B shows a front elevational view of the plug 10 with the patch 10P in the closed-ready position making the plug ready to be inserted into the applicator by the user.

FIG. 1C is a cross-sectional view of the plug 10 with the patch 10P in the closed position, further displaying the holding area 10G for the glue whether applied by the user just prior to use, or pre-packed by the manufacturer.

FIG. 1D displays the direction that the patch 10P expands towards as a prelude to being affixed to the inner wall of the tire. The patch 10P is shown in solid lines in the closed position and in dashed lines in the open position. FIG. 2 shows a full front elevational view of the applicator handle 18 of the present invention in an operational position attached to a tire 12; further displaying the movement of the spring activated handle 18, shown in dashed lines being pressed towards the tire first; causing the injection and expansion of the patch 10p into the tire. FIG. 2 further illustrates that when the handle is released it springs outward away from the tire, as shown in solid lines, while simultaneously pulling the expanding patch 10P eventually against the inner wall of the tire, at which time the user will turn the applicator counter-clockwise until the stem detaches from the tire, then by pulling the applicator up and over the exposed portion of the plug and plug stoppers end totally detaching the applicator from the plug and tire. This can further be achieved by the user manually pulling outward on the tail stopper end of the plug assisting in the expansion of the receiving end of the patch as it becomes first in contact with the leading tip of the applicators stem as the stem stopper is in contact with the outer tread area of the tire, then second while gently pulling both the applicator and the plug simultaneously outward towards the user, this action will affix the patch to the inner wall of the tire known by the snug resistance of the plug when both are gently being pulled outward, at this point the user will release the stopper end of the plug and continue pulling only the applicator in the outward direction towards the user completely and over the plugs stopper end therefore detaching the applicator from the plug and the tire; this subsequent process is necessary only when the applicator used is not equipped with a spring activated compression chamber.

During the construct or manufacturing of the dual purpose plug, it can be molded in the expanded position shown in FIG. 1A; however if decided that the plug is to be pre-packed with glue at the manufacturing level for a selected choice of applicators such as those equipped with a spring activated compression chamber, or when it is packaged for retail and/or just prior to being packed with glue and inserted into the applicator; it will be in the folded or placed in the position shown in FIG. 1B causing it to automatically assume the expanded molded position of FIG. 1A once it is inserted/injected into the tire.

FIG. 3A shows a front elevational view of the applicator handle 18 portion of the present invention; throughout all of the drawings the applicator's "handle" is considered to be any portion of the applicator that the user's hand or hand guided tool comes in contact with in order to make the applicator operational. The handle 18 and stem 18A which are connected to the handle both have the ability to slide over or into one another permitting the usage of the spring 18SP (see FIG. 3B) to fulfill its function of being spring activated.

The threaded tip 18B when turned, e.g., clockwise in this embodiment, will attach the applicator to the tire, the cap 18C being designed to be slid open for the insertion of the plug 10, and the stem stopper 18D once it comes in contact with the tire treads the applicator is ready for the injection of the plug into the tire.

FIG. 3B is a cross-sectional view of the applicator handle 18 portion of the invention depicting the internal mechanisms such the cap 18C designed to be slid open for the placing of the plug 10 through applicator's tunnel 18T and stem 18A, and to be slid closed in order to prevent the plug 10 from popping out of the applicator when the handle 18 is in use by compressing it towards the tire while the plug is simultaneously being injected into the tire, and to further hold and keep the plug 10 attached to the applicator by use of the plug stopper 10ST when the handle and plug is simultaneously raised upward and away from the tire while the upper area of the stem has locking capabilities allowing it to be turned by the handle until the user intentionally detaches the applicator's stem 18A once the plug is attached to the inner wall of the tire by the spring 18SP. Detachment of the applicators from the plug runs consistent through-out all embodiments of the applicators and plugs. Once the plug has been affixed to the inner-wall of the tire and the stem has been detached from the outer-tread of the tire, the user then simply lifts the applicator directly over the plug stopper 10ST for full detachment of the applicator from the tire and plug.

FIG. 4A shows a front elevational view of another embodiment of the applicator handle portion of the present invention in which the applicator has a pen-like shape and includes a pocket clip attached to the handle. FIG. 4A illustrates the stem 28A, which is attached to the tire via the applicator's threaded tip 28B that is screwed clockwise into the tire until the stem-stopper 28D comes in contact with the most outer tread of the tire, while the thumb button 28TB has been designed to inject the plug directly into the pre-existing punctured hole inside of the tire.

FIG. 4B shows a front elevational view of the applicator handle 28 portion of the present invention including a cap 28C, which when opened doubles as a storage area for extra plugs and adhesives, and further allows for the placing of its contents inclusive of the plug, and when the thumb button 28TB is pressed forward in the direction of the tire it will simultaneously inject the patch 10P portion of the plug into the tire.

FIG. 4C is a cross-sectional view of the applicator handle 28 portion of the invention in addition depicting the internal mechanisms of FIG. 4A designed with a tunnel 28T; which further consist of the contents of a dual purpose plug 10 also with the holding abilities of the plug stopper 10ST that allows the user to slide the plug 10 into the tunnel 28T following the placement of the spring 28SP which gives the spring activation to the thumb button 28TB when the applicator is in use for the purpose of simultaneously patching and plugging the punctured hole of a tire.

FIG. 5A shows a front elevational view of the applicator handle 38 portion of another embodiment of the present invention illustrating the attached stem 38A as the attachment point to a hole punctured tire.

FIG. 5B shows another front elevational view of the applicator handle 38 portion of the present invention illustrating the threaded tip 38B of the applicator as the connection point into the punctured hole of the tire until the stem stopper 38D comes in contact with the most outer tread of the tire when in use. In this embodiment, the plug 10 is now manually inserted into and through the tunnel 38T of FIG. 5C until the stopper 10ST of the plug 10 comes in contact with the applicator 38, at which time the patch 10P will expand revealing the leading edge of the plug 10P mentioned earlier in connection with FIG. 1E.

FIG. 6A shows a front elevational view of the applicator handle 48 portion of the present invention; further illustrating the attached stem 48A and the entrance to the tunnel 48T. In this embodiment, an end of the handle portion has a shape configured to be to be engaged by a hand-guided tool, e.g., a polygonal shape that can be engaged by a wrench. The top end of the handle portion could also be slotted to engage a screw driver, Allen wrench, etc.

FIG. 6B shows a side elevational view of the applicator handle 48 portion of the present invention illustrating the threaded tip 48B of the applicator as the connection point into the punctured hole of the tire until the stem stopper 48D comes in contact with the most outer tread of the tire when in use. The plug 10 is now manually inserted into and through the tunnel 48T of FIG. 6C until the stopper 10ST of the plug 10 comes in contact with the applicator 48, at which time the patch 10P will expand revealing the leading edge of the plug 10P as mentioned earlier in connection with FIG. 1E.

FIG. 7A shows a front elevational view of the applicator handle 58 portion of another embodiment of the present invention illustrating the attached stem 58A and the leading tip of the stem 58E as the attachment point designed to be simply pressed into the punctured hole of a tire with the aid of the side hand and finger grips 58G; further displaying the entrance tunnel 58T for the insertion of the plug. In this embodiment, the handle includes a hollow space therein for storing associated items such as spare plugs, glue, etc.

FIG. 7B shows a side elevational view of the applicator handle 58 portion of the present invention illustrating the cap 58C, which when opened acts as a storage area 58S for extra plugs and adhesives, and the stem stopper 58D portion of the applicator that comes in contact with the most outer tread of the tire when in use. The plug 10 is now manually inserted into and through the tunnel 58T, the tunnel being better shown in the cross-sectional view FIG. 7C, until the plug 10's stopper 10ST comes in contact with the applicator 58, at which time the patch 10P will expand revealing the leading edge of the plug 10P as mentioned earlier in connection with FIG. 1E.

FIG. 8A shows a front elevational view of the applicator handle 68 portion of another embodiment of the present invention illustrating the cap 58C, which when opened acts as the entrance to the storage area 58S of the applicator, as better shown in FIG. 8B, for extra plugs and adhesives. in this embodiment, the attached stem 68A via the handle support bar 68HS, acts as the leading tip of the stem 68E as the attachment point of the tire designed to be simply pressed into the punctured hole until the stem stopper 68D comes in contact with the most outer tread of the tire when in use aided by the side hand and finger grips 68G; further displayed is the entrance tunnel 68T, the tunnel being best shown in the cross-sectional view of FIG. 8B, for the manual insertion of the plug 10 into and through the tunnel 68T, until the stopper 10ST of the plug 10 comes in contact with the applicator 68, at which time the patch 10P will expand revealing the leading edge of the plug 10P as mentioned earlier in connection with FIG. 1E.

Once the dual purpose plug has been inserted/injected into the tire and affixed to the inner wall of the tire, the user will ultimately detach the applicator from the affixed plug and tire as mentioned above, therefore exposing the remaining portion of the plug along with its stopper end. The exposed end of the plug can then be cut off by taking a blade or sharp knife-like object and placing it flat or horizontal as possible against the area where the exposed plug and tire meet. This will remove all of the exposed portions of the plug and eliminate the snagging effect altogether.

The problem associated with conventional tire repair kits of FIGS. 9A and 9B of over-forcing the pole portion 78PO along with the plug 78PL deeply into the inner tire area to the point that the plug is totally inside of the tire, so that when the user then pulls outward as to remove the tool FIG. 9B from the tire, the plug will detach from the said tool and free-fall into the tire, is an impossibility with the current invention thanks to the stem being equipped with a stem stopper as shown in references FIG. 2 (18D), FIG. 3A (18D), FIG. 4A (28D), FIG. 5B (38D), FIG. 6B (48D), FIG. 7B (58D), and FIG. 8A (68D), which allows the user to insert only a fraction of the stem and plug in a controlled manner.

The present invention also relates to a method of using the tire repair device shown and described herein, including inserting the tip portion of the applicator into a puncture and through a wall of the tire, pushing the plug, with the patch portion in the closed position through the passage through at least a part of the stem portion and the tip portion so that the patch portion is completely inside the tire, expanding the patch portion into the open position in which the patch portion is extends outwardly from the plug shaft in a direction substantially perpendicular to the plug shaft, pulling the stopper portion of the plug away from the tire, and cutting portions of the stem portion and stopper portion of the plug that extend outside the tire.

The present invention also relates to a kit, including an applicator including a stem portion and a tip portion for insertion into a puncture and through a wall of the tire, at least a part of the stem portion and the tip portion having a passage therethough, and a plurality of plugs, each plug comprising a plug shaft made of a resilient material, a stopper portion provided at a first end of the plug shaft and a patch portion provided at a second end of the plug shaft opposite the first end, the patch portion having a closed position in which the patch portion is folded around the plug shaft and an open position in which the patch portion is extends outwardly from the plug shaft in a direction substantially perpendicular to the plug shaft, the plug shaft and the patch portion of the plug being guidable through the passage in the applicator. The kit can also include glue.

I claim:

1. A tire repair device for repairing a puncture in a vehicle tire, comprising:
   an applicator including a stem portion, a tip portion for insertion into a puncture and through a wall of the tire and a handle portion at an end of the stem portion opposite the tip portion, the stem portion and the tip portion being integrally formed, at least a part of the stem portion and the tip portion having a passage therethough, the tip portion having a diameter that does not change during the repair operation, a forward end of the tip portion being configured to be the first portion inserted into a puncture and through a wall of the tire, the tip portion being adapted to engage a portion of the wall of the tire surrounding the puncture;
   a plug comprising a plug shaft made of a resilient material, a stopper portion provided at a first end of the plug shaft and a patch portion provided at a second end of the plug shaft opposite the first end, the patch portion having a closed position in which the patch portion is folded around the plug shaft and an open position in which the patch portion is extends outwardly from the plug shaft in a direction substantially perpendicular to the plug shaft, the plug shaft and the patch portion of the plug being guidable through the passage in the applicator; and
   a resilient member configured to force the handle portion, when released by the user, outwardly away from the tire while simultaneously gulling the patch portion of the plug against the inner wall of the tire.

2. The tire repair device according to claim 1, wherein the plug shaft comprises circumferential ribs at a portion around which the patch portion folds in the closed position.

3. The tire repair device according to claim 1, wherein the handle portion has a width or diameter, in a direction substantially perpendicular to a longitudinal axis of the stem portion, larger than a width or diameter of the stem portion and is configured to be held by a user's hand.

4. The tire repair device according to claim 3, wherein the passage extends completely though the stem portion and the tip portion and the handle includes a cap that can be opened to insert the plug therein.

5. The tire repair device according to claim 1, wherein the handle portion has a width or diameter, in a direction substantially perpendicular to a longitudinal axis of the stem portion, approximately the same as a width or diameter of the stem portion.

6. The tire repair device according to claim 5, wherein the applicator has a pen-like shape and includes a pocket clip attached to the handle.

7. The tire repair device according to claim 1, wherein an end of the handle portion has a shape configured to be to be engaged by a hand-guided tool.

8. The tire repair device according to claim 3, wherein the handle includes a hollow space therein for storing spare plugs.

9. A kit, comprising:
   an applicator including a stem portion, a tip portion for insertion into a puncture and through a wall of the tire and a handle portion at an end of the stem portion opposite the tip portion, the stem portion and the tip portion being integrally formed, at least a part of the stem portion and the tip portion having a passage therethough, the tip portion having a diameter that does not change during the repair operation, a forward end of the tip portion being configured to be the first portion inserted into a puncture and through a wall of the tire, the tip portion being adapted to engage with a portion of the wall of the tire surrounding the puncture;
   a plurality of plugs, each plug comprising a plug shaft made of a resilient material, a stopper portion provided at a first end of the plug shaft and a patch portion provided at a second end of the plug shaft opposite the first end, the patch portion having a closed position in which the patch portion is folded around the plug shaft and an open position in which the patch portion is extends outwardly from the plug shaft in a direction substantially perpendicular to the plug shaft, the plug shaft and the patch portion of the plug being guidable through the passage in the applicator; and
   a resilient member configured to force the handle portion, when released by the user, outwardly away from the tire while simultaneously gulling the patch portion of the plug against the inner wall of the tire.

10. The kit according to claim 9, further comprising glue.

11. The kit according to claim 9, wherein the resilient member is a spring.

12. The tire repair device according to claim 1, wherein the resilient member is a spring.

13. The tire repair device according to claim 1, wherein the plug shaft has a plurality of ribs adjacent the patch portion, and the patch portion has a closed position in which the patch portion is folded around the plug shaft and entirely enveloping the ribs.

14. The kit according to claim 9, wherein the plug shaft has a plurality of ribs adjacent the patch portion, and the patch portion has a closed position in which the patch portion is folded around the plug shaft and entirely enveloping the ribs.

15. The tire repair device according to claim 1, wherein the tip portion includes threads for engaging the tip portion with a portion of the wall of the tire surrounding the puncture.

16. The kit according to claim 9, wherein the tip portion includes threads for engaging the tip portion with a portion of the wall of the tire surrounding the puncture.

17. A tire repair device for repairing a puncture in a vehicle tire, comprising:
   an applicator including a stem portion, a tip portion for insertion into a puncture and through a wall of the tire and a handle portion at an end of the stem portion opposite the tip portion, the stem portion and the tip portion being integrally formed, at least a part of the stem portion and the tip portion having a passage therethough, the tip portion having a diameter that does not change during the repair operation, a forward end of the tip portion being configured to be the first portion inserted into a puncture and through a wall of the tire; and a plug comprising a plug shaft made of a resilient material, a stopper portion provided at a first end of the plug shaft and a patch portion provided at a second end of the plug shaft opposite the first end, the patch portion having a closed position in which the patch portion is folded around the plug shaft and an open position in which the patch portion is extends outwardly from the plug shaft in a direction substantially perpendicular to the plug shaft, the plug shaft and the patch portion of the plug being guidable through the passage in the applicator, the plug shaft having a plurality of ribs adjacent the patch portion, and, in the closed position, the patch portion entirely envelopes the ribs.

18. The tire repair device according to claim 17, wherein the tip portion includes threads for engaging the tip portion with a portion of the wall of the tire surrounding the puncture.

19. A kit comprising the tire repair device according to claim 17 and a plurality of the plugs.

20. The kit according to claim 19, further comprising glue.

* * * * *